United States Patent [19]
Feldman et al.

[11] 3,789,351
[45] Jan. 29, 1974

[54] GUIDANCE SYSTEM

[75] Inventors: David W. Feldman; James C. Slone, Jr., both of Panama City, Fla.

[73] Assignee: The United States of America as represented by the Secretary of the Navy, Washington, D.C.

[22] Filed: Sept. 4, 1970

[21] Appl. No.: 78,341

[52] U.S. Cl.......................... 340/4 R, 114/23, 324/3
[51] Int. Cl........................ G01r 33/02, G01c 19/30
[58] Field of Search....... 340/4 R; 324/3, 8; 114/23; 102/18, 70.2 P

[56] References Cited
UNITED STATES PATENTS

| | | | |
|---|---|---|---|
| 2,406,870 | 9/1946 | Vacquier............................ | 340/4 R |
| 3,135,199 | 6/1964 | Brown................................ | 340/4 R |
| 3,308,760 | 3/1967 | Peters............................... | 102/18 X |

Primary Examiner—Richard A. Farley
Attorney, Agent, or Firm—Richard S. Sciascia; Don D. Doty

[57] ABSTRACT

A guidance system is disclosed which employs three total field magnetometer sensors located in a plane and spaced equiangularly about the axis of locomotion. Circuitry is disclosed to combine the outputs of adjacent sensors for operation of a control element positioned at right angles to the plane of the sensors, so as to steer a desired course with respect to a magnetic anomaly in an ambient, i.e., the earth's, magnetic field. Circuitry is also disclosed which is effective to resolve the ambiguity of steering toward or away from the anomaly and, thereby, insure the desired course of steerage.

8 Claims, 3 Drawing Figures

PATENTED JAN 29 1974

David W. Feldman
James C. Slone, Jr.
INVENTORS

By William T. Skeer
Agent

Dox D. Doty
Attorney

GUIDANCE SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Conventional methods for detecting submerged objects may be classified as active or passive systems. In the active systems, the best example of which is, perhaps, the sonar system, sound energy is periodically radiated into the fluid medium by a transducer which subsequently operates in a receiving mode to detect echoes reflected from submerged targets within the propagating path. These echo ranging systems have well-known limitations, such as the transmission loss which increases as a function of the frequency of the propagated energy and the transmission irregularities caused by temperature and other physical changes normally occurring within the fluid medium.

In passive systems the apparatus detects disturbances in the environment caused by the presence therein of the submerged object. Passive systems may employ, for example, infrared sensors to scan areas of the sea surface to identify temperature discontinuities or magnetometers to identify disturbances or distortions in the earth's magnetic field. The instant invention provides a passive system of this type.

The location of anomalies in the earth's magnetic field is a well developed art and is used extensively in geological prospecting, the making of navigaton charts, and locating large disconformities in the earth's crust. One such system, for example, is shown in U. S. Pat. No. 3,490,032 granted on Jan. 13, 1970, to E. G. Zurflueh for "Method and Apparatus Utilizing A Pair of Spaced Magnetometers for Making Magnetic Surveys."

For the most part, the prior art methods of object location by magnetic means are characterized by mapping techniques which, although very satisfactory for their intended purpose, require the expenditure of considerable time to accomplish. When the sought anomaly is a source of potential environmental contamination, such as a container of fissionable material or a source of a large volume of petroleum, it is imperative that the location be accomplished with a minimum expenditure of time. In such instances, location by the area mapping and investigation techniques of the prior art are too time consuming, and a rapid location technique having sufficient precision to permit accurate position location of small targets has been an unobtainable goal for some time.

SUMMARY OF THE INVENTION

This invention utilizes a spatially oriented configuration of magnetic sensors to guide a vehicle to a submerged object by detection of the magnetic anomaly caused thereby. The vehicle may be tracked by other means, such as sonar, for example, to locate the object. Additionally the vehicle may be provided with telemetering equipment to identify the particular anomaly. Such equipment is particularly useful in identifying sunken ships, marine mines, and other objects of interest to which the vehicle may be guided. The invention utilizes an arrangement of sensors and control surfaces which permits guidance control in all directions without vehicle roll stabilization.

In view of the foregoing, it is an object of this invention to provide an improved guidance system.

A further object of this invention is to provide a guidance system which uses magnetic sensors.

A further object of this invention is to provide a method and means for locating submerged objects.

A still further object of the present invention is the provision of a magnetic vehicular guidance system.

A still further object of this invention is to provide for the control of a plurality of motors from sensed magnetic parameters.

Another object of this invention is the provision of a spatial guidance system employing total field magnetometers as sensing elements.

A further object of this invention is to provide a method and means for locating submerged objects by guiding a vehicle thereto utilizing the magnetic disturbances of the earth's field caused thereby.

Yet another object of this invention is to provide a guidance circuit responsive to magnetic fields which is free from guidance ambiguities of heading toward or away from the desired course.

Another object of the present invention is to provide a system for detection of submerged vessels which employs magnetometers which respond to the total geomagnetic field to generate electrical signals.

Other objects and many of the attendant advantages will be readily appreciated as the subject invention becomes better understood by reference to the following detailed description, when considered in conjunction with the accompanying drawings.

DESCRIPTION OF THE PREFERRED EMBODIMENT

Figure 1:
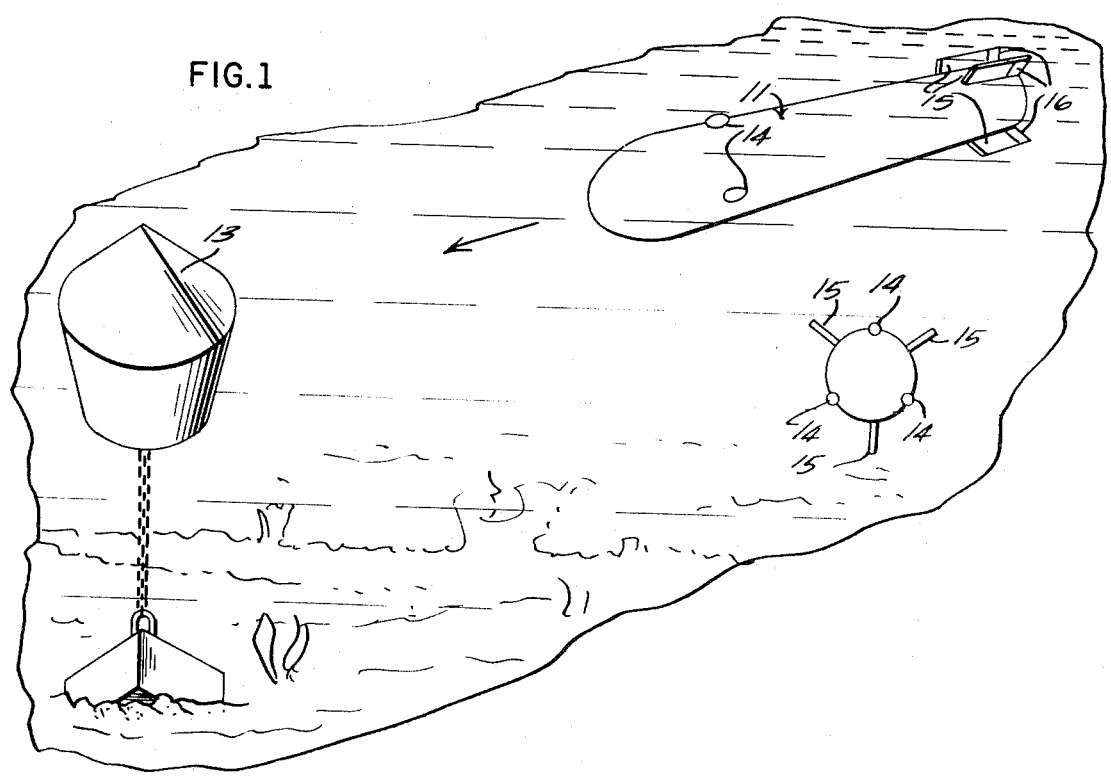
FIG. 1 is an elevation view showing two vehicles homing on a target.

Referring to FIG. 1, there is shown two identical vehicles 11 and 12 homing on a marker or target 13. It should be understood that, normally, only a single vehicle is deployed, but, for purposes of illustration, two are shown. Likewise, marker 13, which resembles certain types of marine mines, is only of illustrative significance. However, it should be understood that the invention may, if desired, be used to locate marine mines.

Vehicles 11 and 12 have three sensors 14 located in a plane at right angles to the vehicle's propulsion axis and equally spaced about their outer surface. Three stabilizing fins 15, likewise equally spaced about the outer circumference of vehicles 11 and 12, have control surfaces 16 on the aft edge thereof.

As will be readily understood by those versed in the art, sensors 14 may be mounted on radially extending supports to increase the spacing therebetween. Likewise, other location arrangements for fins 15 are possible, but that shown has the desirable feature of placing the control surfaces at right angles to the sensor pairs which control their operation.

It should be noted that the vehicles 11 and 12 may have other externally visible features which, since they do not pertain to the guidance of the vehicle, are not illustrated herein. For example, a camera, television or other type, together with an illumination source may be housed in the foreward part of the vehicle. Such details are known, per se, and form no part of the guidance system of the invention.

Likewise the propulsion mechanisms of vehicles 11 and 12 are not disclosed or discussed in detail herein. A variety of systems are known in the art and are available to the skilled constructor. For example, depending upon the size of the vehicle, the non-electric propulsion motor systems used in some torpedo mechanisms may be employed in the invention.

Figure 2:
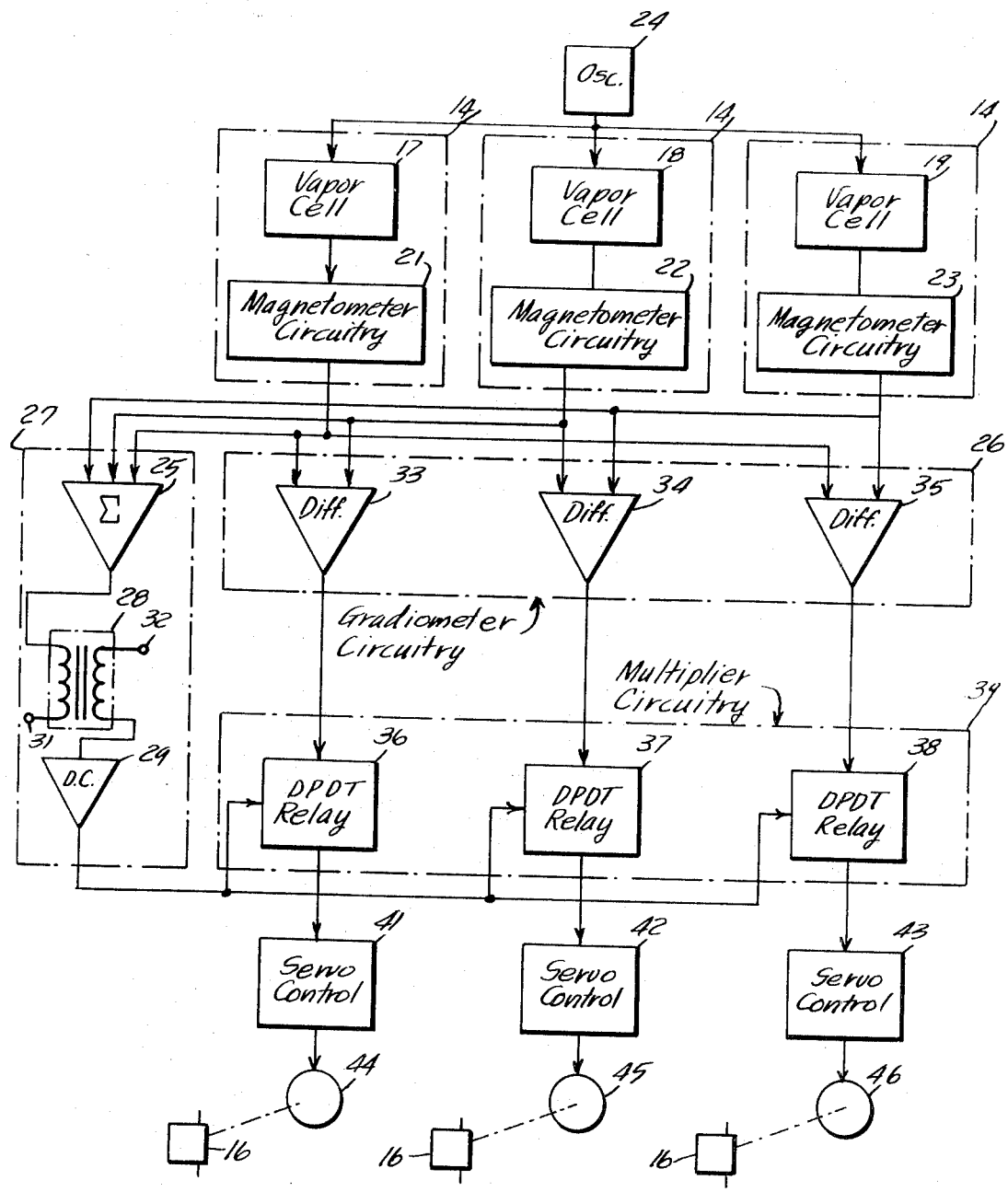
FIG. 2 is a block diagram of the circuit arrangement of the system of the invention.

Referring to FIG. 2, it may be seen that each sensor 14 comprises a vapor cell 17, 18, and 19, and associated electrical circuitry 21, 22, and 23. Vapor cells 17, 18, and 19 may, for example, be of the cesium vapor or rubidium vapor type, if desired. In some examples of this type of magnetometer there are dead spots in the coverage, that is zones of insensitivity, and, when using instruments having these dead spots, several units may be combined to form a single vapor cell unit having omnidirectional response characteristics. Other types of total field magnetometers, such as, the protron precision or flux gate types, may be used, if desired.

An oscillator 24 is connected to each of vapor cells 17, 18, and 19 so as to supply the necessary energization potential therefor.

Each of the sensors 14 have three outputs; one is connected to a summing amplifier 25; and the remaining two are connected to gradiometer circuits 26.

To provide homing control it is necessary to determine whether the magnetic sensors are moving toward or away from the positive or negative pole of the magnetic target. This is accomplished by using the time derivative of the field (dH/dt) detected by one or more of sensors 14 to control a polarity element which is binary in nature; that is, it either activates an inverting switch or it does not according to the polarity of dH/dt. The output of the derivative circuit is designated "P" and is limited to effective values of plus or minus one in the equations of operation.

The equations of operation are as follows:

$$d\theta_1/dt = K\phi_1 = KP (H_A - H_B)$$
$$d\theta_2/dt = K\phi_2 = KP (H_B - H_C)$$
$$d\theta_3/dt = K\phi_3 = KP (H_C - H_A)$$

where "$d\theta/dt$" is the time rate of change of vehicle heading about a given control axis, "K" a constant of proportionality, $\phi_1$, $\phi_2$, and $\phi_3$ are the correction signals emitted by the servo-control systems to the applicable vehicle heading control elements, and "P" is the polarity of the time derivative of the magnetic field intensity. Requirements for damping are neglected here as they are dependent on specifics of the particular vehicle, the medium, and the type and arrangement of heading control elements. The circuitry which generates this function "P" is known as time derivative circuitry 27, of which summing amplifier 25 is a component part.

Summing amplifier 25 combines the outputs of the magnetometer circuit 21, 22, and 23 has its output connected to a circuit which has an output proportional to the time derivative of the input. In the illustrated embodiment this circuit is represented by transformer 28, a simple element which meets the requirements of the system. The output of transformer 28 is connected to direct current amplifier 29 which increases the power level of the signals supplied thereto. Terminals 31 and 32 of transformer 28 are shown unconnected for purposes of simplicity of illustration, however, they may be connected to suitable direct current potential sources, such as ground, for example, in the actual embodiment.

Gradiometer Circuitry 26 is seen to comprise three differential amplifiers 33, 34, and 35. Other circuitry to subtract the input signals is available from the digital and analog signal processing arts, and may be used instead of the circuitry shown, if desired. Differential amplifier 33 receives its input signals from nagnetometer circuitry 21 and 22; differential amplifier 34 receives its input signals from magnetometer circuits 22 and 23; and differential amplifier 35 receives its input signals from magnetometer circuits 21 and 23.

As a result of the aforedescribed connection arrangement, three channels of control signals are developed. The basic parameters of control is the difference in the magnetic field detected by the total field sensors 14. To determine whether the control signal is used to produce a left or right correction, to use convenient direction descriptors, depends upon whether the vehicle is approaching a north or south magnetic field. As noted previously this is determined electrically by time derivative circuit 27 which is connected to suitable polarity reversing circuits, double pole double throw relays 36, 37, and 38 in the illustrated embodiment, in each control signal channel. Relays 36, 37, and 38, or their equivalent circuitry, together comprise multiplier circuitry 39 which multiplies the output of gradiometer circuitry 26 by the function "P," plus or minus unity.

Each differential amplifier of gradiometer circuitry 26 is connected to a servo control element via multiplier circuitry 39. Thus, differential amplifier 33 is connected, via DPDT relay 36, to servo control 41; differential amplifier 34 is connected, via DPDT relay 37, to servo control 42; and differential amplifier 35 is connected, via DPDT relay 38, to servo control 43. The outputs of servo control circuits 41, 42, and 43 are connected to electrical servo motors 44, 45, and 46, respectively. The servo motors develop the mechanical analog of the detected electrical signal and are connected to the control elements, control surfaces 16, to provide mechanical actuation thereof.

The control system of the invention is simplified by the use of three channel control since vertical stabilization may be dispensed with. In systems using an optical telemetering arrangement to transmit views from the front of the vehicle, some gravity sensing arrangement may be provided to counter vehicle spin.

Although the vehicle is shown with rudder-like control surfaces 16, it should be understood that servo motors 44, 45, and 46 may control movable propellers, spaced jets, or other steering instrumentality, if desired. Other electrical transponders may be used in place of the servo motor controlled instrumentality, such as, solenoid controlled valves. Likewise, the three dimensional guidance system may be combined with other sensed controls, such as height off bottom sensors and anti-collision controls to provide a more elaborate homing control system. Such modifications would be within the scope of a person versed in oceanographic instrumentation and electronic guidance systems.

For applications where the vehicle and the magnetic target are for some reason restricted to the same plane, or where it is desired that a vehicle in a plane near the target pass through the point in that plane that is nearest to the target, a simpler guidance system will suffice. Only two magnetic sensors separated at some fixed distance from each other is required together with the necessary magnetometer instrumentation, one gradiometer circuit, one multiplier, one servo-control element, and a vehicle control element for only a single control axis, The line between the two magnetic sensors should be in the same plane to which the vehicle is constrained and perpendicular to its thrust axis. The control axis should be perpendicular to both the thrust angle and the plane to which the vehicle is constrained. The time derivative circuitry is still required to determine the polarity signal "P."

MODE OF OPERATION

Figure 3:
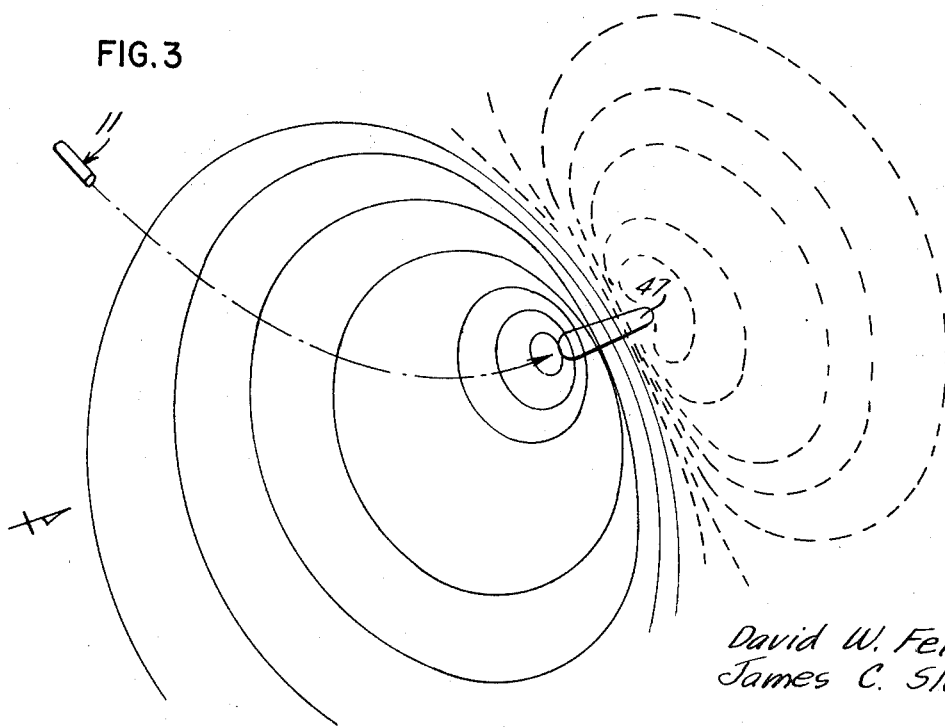
FIG. 3 is a plan view showing a single vehicle homing on an object and illustrating the course thereof in relation to the magnetic field thereabout.

Referring to FIG. 3, taken together with FIG. 2, the mode of operation may be understood. A target 47 is shown as resting on the bottom with the magnetic field shown thereabout by solid lines representing one polarity of the magnetic field surrounding the object and broken lines the other field. The lines themselves correspond to contour lines of equal magnetic field intensity. These contour lines are, in FIG. 3, the intersection of surfaces of equal magnetic field intensity with a horizontal plane which does not include the target.

Sensors 14 develop signals to drive motors 44, 45, and 46, as described above, to seek a path where the signal strengths in each sensor 14 remain equal. This path causes vehicle 11 to cross each of the lines in a perpendicular fashion. As a result, the trajectory, as shown by line 48, follows a magnetic flux line over the target.

In operation a vehicle 11, as described, is placed in the water in the vicinity of the target. The vehicle homes on the target in substantially the manner described and is tracked thereto by suitable instrumentation. The target may be a natural magnetic anomaly such as an ore body or it may be a man made anomaly such as a sunken ship. One special case which should be considered is the guiding to an artificial target. In such application the vehicle may home on a magnet placed on a structure, such as an oil well head, which is desired to be relocated.

The propulsion system of vehicle 11 carries it toward the target under the guidance of the aforedescribed guidance system. Collision with the target is prevented by a secondary automatic control system, as previously discussed, or by assuming manual control as the target is approached.

In cases where the vehicle carries auxiliary equipment, it may be docked at the target. One such case is where the vehicle carries one end of a flexible conduit to be attached to a well head or an oil storage facility. In other instances, only the location of the target is of importance, and, in such circumstances vehicle 11 may be guided over the target and mark its passage thereover by suitable circuitry which may be conveniently activated by time derivative circuitry 27. Once the target is located, the salvage operation or pollution control measures may proceed without further delay.

The speed and ease of location made possible by this invention marks the opening of a new era of pollution control and salvage operations in the ocean environment. When viewed in the light of man's battle to preserve the ecological balance of his planet, the profound implications of the herein disclosed invention become apparent.

Obviously, other embodiments and modifications of the subject invention will readily come to the mind of one skilled in the art having the benefit of the teachings presented in the foregoing description and the drawings. It is, therefore, to be understood that this invention is not to be limited thereto and that said modifications and embodiments are intended to be included within the scope of the appended claims.

What is claimed is:

1. A system for guiding a vehicle having a propulsion axis and steering means effective to change the course thereof, comprising in combination:

detector means attached to said vehicle in a predetermined orientation with respect to the propulsion axis thereof and omnidirectionally responsive to field energy at the locations thereof for generating a first plurality of electrical output signals in response thereto;

time derivative circuit means electrically connected to the outputs of said detector means for generating another electrical signal which is a time derivative of at least one of said first plurality of electrical output signals;

gradiometer circuitry means electrically connected to the outputs of said detector means, so as to receive the first plurality of electrical output signals therefrom for developing a plurality of electrical gradient signals in response thereto;

multiplier circuitry means electrically connected to the outputs of said gradiometer circuitry means, so as to receive the plurality of electrical gradient signals therefrom, and electrically connected to the output of said time derivative circuitry means, so as to receive said electrical time derivative signal therefrom, for producing a second plurality of electrical output signals which are respectively proportional to the products of each of said plurality of electrical gradient output signals multiplied by the aforesaid time derivative output signal; and electro-mechanical transducer means electrically connected to the outputs of said multiplier circuitry means for response to said second plurality of electrical output signals and effectively mechanically connected to said vehicle steering means for correcting the travel direction of said vehicle in accordance with said second plurality of electrical output signals.

2. A guidance system according to claim 1 in which said detector means comprises three ambient field sensors equally spaced about said propulsion axis.

3. A guidance system according to claim 2 in which said ambient field sensors are total field magnetometers.

4. A guidance system according to claim 3 in which said total field magnetometers are of the vapor cell type.

5. A guidance system according to claim 1 in which said time derivative circuit means comprises an inductively coupled electrical transformer.

6. A guidance system according to claim 1 in which said gradiometer circuitry means comprises three differential amplifiers.

7. A guidance system according to claim 1 in which said multiplier circuitry means comprises three double pole double throw relays.

8. A guidance system according to claim 1 in which said electro-mechanical transponder means comprises three servo controlled motors.

* * * * *